US010930084B2

(12) United States Patent
Kim et al.

(10) Patent No.: US 10,930,084 B2
(45) Date of Patent: Feb. 23, 2021

(54) ELECTRONIC DEVICE INCLUDING DISPLAY UNIT AND METHOD OF OPERATING THE SAME

(71) Applicant: Samsung Display Co., Ltd., Yongin-si (KR)

(72) Inventors: Beomshik Kim, Yongin-si (KR); Jaejoong Kwon, Suwon-si (KR); Rangkyun Mok, Seoul (KR); Joowoan Cho, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/564,863

(22) Filed: Sep. 9, 2019

(65) Prior Publication Data

US 2020/0126303 A1 Apr. 23, 2020

(30) Foreign Application Priority Data

Oct. 18, 2018 (KR) .......................... 10-2018-0124529

(51) Int. Cl.
*G06T 19/00* (2011.01)
*G06T 15/20* (2011.01)

(52) U.S. Cl.
CPC ............ *G06T 19/006* (2013.01); *G06T 15/20* (2013.01)

(58) Field of Classification Search
None
See application file for complete search history.

(56) References Cited

U.S. PATENT DOCUMENTS

| 9,846,965 | B2 | 12/2017 | Mitchell et al. |
| 10,015,473 | B2 | 7/2018 | Ito |
| 2005/0195478 | A1 | 9/2005 | Yanagawa et al. |
| 2011/0304703 | A1* | 12/2011 | Ito .......................... G06T 19/006 348/47 |

(Continued)

FOREIGN PATENT DOCUMENTS

| EP | 2 395 769 A1 | 12/2011 |
| JP | 5622609 B2 | 11/2014 |

(Continued)

OTHER PUBLICATIONS

Extended European Search Report for corresponding European Application No. 19203954.3, dated Mar. 4, 2020, 7 pages.

*Primary Examiner* — Robert J Craddock
(74) *Attorney, Agent, or Firm* — Lewis Roca Rothgerber Christie LLP

(57) ABSTRACT

An electronic device includes a display configured to display a three-dimensional image, a camera configured to photograph a real image, and a controller configured to generate an image signal based on the real image and augmented reality (AR) image data and to provide the image signal to the display, the controller including a multi-view image generator configured to convert the AR image data into multi-view AR images, a graphics processor configured to compose each of the multi-view AR images with the real image to generate multi-view composition images, and a processor configured to control a multi-view virtual camera and the graphics processor, to convert the multi-view composition images into the image signal, and to provide the image signal to the display.

19 Claims, 14 Drawing Sheets

(56) References Cited

U.S. PATENT DOCUMENTS

| | | | | |
|---|---|---|---|---|
| 2012/0086708 A1* | 4/2012 | Lin | ............... | H04N 13/324 |
| | | | | 13/324 |
| 2013/0278631 A1* | 10/2013 | Border | ............... | G06F 3/04842 |
| | | | | 345/633 |
| 2015/0222874 A1* | 8/2015 | Thiebaud | ............ | H04N 13/194 |
| | | | | 348/51 |
| 2018/0255284 A1* | 9/2018 | Holzer | ............... | G06F 3/04815 |

FOREIGN PATENT DOCUMENTS

| KR | 10-1280210 B1 | 6/2013 |
|---|---|---|
| KR | 10-2016-0109828 A | 9/2016 |

\* cited by examiner

ELECTRONIC DEVICE INCLUDING DISPLAY UNIT AND METHOD OF OPERATING THE SAME

CROSS-REFERENCE TO RELATED APPLICATION

This application claims priority to and the benefit of Korean Patent Application No. 10-2018-0124529, filed on Oct. 18, 2018 in the Korean Intellectual Property Office, the content of which is hereby incorporated by reference in its entirety.

BACKGROUND

1. Field

Aspects of the present disclosure relates to an electronic device including a display unit and a method of operating the same.

2. Description of the Related Art

A three-dimensional (3D) display technology is applied to various image display fields, such as a movie, a television set, or a mobile phone. The ultimate goal of the 3D display technology is to allow people to experience the same 3D effect as they would in a real environment. To this end, various technologies, such as a stereo method and a multi-view method, are being studied. Among them, a light-field method reproduces 3D spatial information more accurately than the stereo method or the multi-view method.

Meanwhile, an augmented reality (AR) technology that displays computer-synthesized objects, as if they co-exist in the same space as the real world by merging the virtual objects with a real world environment, is under development.

In the coming years, the need for technologies to display the AR image through the display unit as the 3D image is expected to increase.

SUMMARY

Aspects of embodiments of the present disclosure are directed to an electronic device for displaying an augmented reality image through a three-dimensional display unit.

Aspects of embodiments of the present disclosure are directed to a method of displaying the augmented reality image in three-dimension.

According to some embodiments of the inventive concept, there is provided an electronic device including: a display configured to display a three-dimensional image; a camera configured to photograph a real image; and a controller configured to generate an image signal based on the real image and augmented reality (AR) image data and to provide the image signal to the display, the controller including: a multi-view image generator configured to convert the AR image data into multi-view AR images; a graphics processor configured to compose each of the multi-view AR images with the real image to generate multi-view composition images; and a processor configured to control a multi-view virtual camera and the graphics processor, to convert the multi-view composition images into the image signal, and to provide the image signal to the display.

In some embodiments, the controller further includes a memory configured to store the AR image data.

In some embodiments, the real image includes at least one of a marker and an object, and each of the multi-view AR images includes an AR object.

In some embodiments, when a first separation distance between the camera and at least one of the marker and the object is changed, the processor is configured to control the multi-view image generator such that a second separation distance between the multi-view image generator and the AR object is changed based on an amount of change of the first separation distance.

In some embodiments, the multi-view image generator utilizes a plurality of virtual cameras that convert the AR image data to the multi-view AR images respectively corresponding to a plurality of views.

In some embodiments, the multi-view image generator is configured to convert the AR image data to the multi-view AR images respectively corresponding to a plurality of views.

In some embodiments, the controller further includes a wireless transceiver configured to receive the AR image data from an outside of the electronic device in a wireless communication manner.

In some embodiments, the display includes a light-field display, and the light-field display includes: a display panel including a plurality of pixels; and a micro-lens array on the display panel and including a plurality of micro-lenses.

In some embodiments, the processor is configured to map the multi-view composition images to the image signal respectively corresponding to the pixels.

In some embodiments, the processor is further configured to model the real image three-dimensionally to generate multi-view real images, and the graphics processor composes each of the multi-view AR images with multi-view real images to generate the multi-view composition images.

In some embodiments, the camera includes a three-dimensional camera that photographs a three-dimensional real image.

In some embodiments, the processor generates multi-view real images based on the three-dimensional real image, and the graphics processor composes each of the multi-view AR images with the multi-view real images to generate the multi-view composition images.

In some embodiments, the AR image data include coordinate information and depth information corresponding to an AR object.

According to some embodiments of the inventive concept, there is provided a method of operating an electronic device including a plurality of pixels and a display displaying a three-dimensional image, the method including: receiving a real image from a camera; receiving AR image data; converting the AR image data to multi-view AR images; composing the multi-view AR images with the real image to generate multi-view composition images; converting the multi-view composition images to an image signal; and outputting the image signal to the display.

In some embodiments, the electronic device further includes a memory configured to store the AR image data.

In some embodiments, the AR image data are received from an outside in a wireless communication manner.

In some embodiments, the real image includes at least one of a marker and an object, and each of the multi-view AR images includes an AR object.

In some embodiments, the converting of the AR image data to the multi-view AR images includes: when a first separation distance between the camera and at least one of the marker and the object is changed, changing a size of the AR object included in each of the multi-view AR images based on an amount of change of the first separation distance.

In some embodiments, the receiving of the real image from the camera includes modeling the real image three-dimensionally to generate multi-view real images, and the composing the multi-view AR images with the real image includes composing the multi-view AR images with the multi-view real images.

In some embodiments, the converting of the multi-view composition images to the image signal includes mapping the multi-view composition images to respectively correspond to the pixels of the display so that the multi-view composition images are converted to the image signal.

Accordingly, the electronic device may display the AR image through the three-dimensional display unit. In particular, the AR image data may be provided to the display unit after being converted to the multi-view AR images and composed (e.g., overlaid) with the real image. Thus, the AR object may be displayed with a natural depth perception in the real image.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Figure 1:
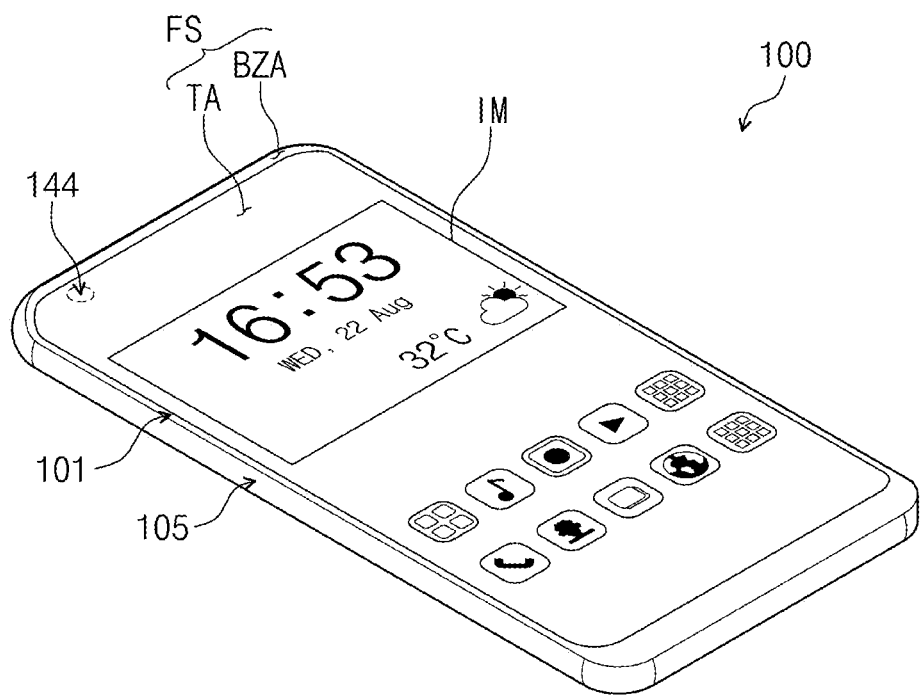
FIG. 1 is a perspective view illustrating an electronic device, according to an exemplary embodiment of the present disclosure.

The terminology used herein is for the purpose of describing particular embodiments and is not intended to be limiting of the inventive concept.

It will be understood that when an element or layer is referred to as being "on", "connected to" or "coupled to" another element or layer, it can be directly on, connected or coupled to the other element or layer or intervening elements or layers may be present. When an element or layer is referred to as being "directly on," "directly connected to", "directly coupled to", or "immediately adjacent" another element or layer, there are no intervening elements or layers present.

Like numerals refer to like elements throughout. In the drawings, the thickness of layers, films, and regions are exaggerated for clarity.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when an element is referred to as being "between" two elements, it can be the only element between the two elements, or one or more intervening elements may also be present Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The electronic device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the electronic device may be formed on one integrated circuit (IC) chip or on separate IC chips. Further, the various components of the electronic device may be implemented on a flexible printed circuit film, a tape carrier package (TCP), a printed circuit board (PCB), or formed on a same substrate. Further, the various components of the electronic device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Hereinafter, the present invention will be explained in detail with reference to the accompanying drawings.

FIG. 1 is a perspective view illustrating an electronic device 100, according to an exemplary embodiment of the present disclosure.

Referring to FIG. 1, the electronic device 100 may be a device that is activated in response to an electronic signal. The electronic device 100 may be embodied in various ways. For example, the electronic device 100 may include a tablet computer, a notebook computer, a computer, a smartphone, or a smart television set. In the present exemplary embodiment, the smartphone is shown as the electronic device 100.

The electronic device 100 includes a window member 101 and a housing unit (e.g., housing member) 105. In the present exemplary embodiment, the window member 101 and the housing unit 105 are coupled to each other to form an exterior of the electronic device 100.

A display surface of the electronic device 100, through which an image IM is displayed, may correspond to a front surface FS of the electronic device 100. The image IM may include a moving image and a still image. FIG. 1 shows a two-dimensional (2D or planar) image as a representative example of the image IM, however, a three-dimensional (3D or stereoscopic) image may also be displayed as the image IM.

The window member 101 may include an insulating panel. For example, the window member 101 may include a glass, a plastic, a combination thereof, and/or the like.

As described above, a front surface of the window member 101 defines the front surface FS of the electronic device 100. The front surface FS of the electronic device 100 includes a transmission area TA and a bezel area BZA. The transmission area TA may be an optically transparent area. For example, the transmission area TA has a visible light transmittance of about 90% or more.

The bezel area BZA has a light transmittance that is relatively lower than that of the transmission area TA. The bezel area BZA defines a shape of the transmission area TA. The bezel area BZA is disposed adjacent to the transmission area TA to surround the transmission area TA. In the window member 101 according to an exemplary embodiment of the present disclosure, the bezel area BZA may be omitted.

The transmission area TA may include a camera module (e.g., a camera) 144. FIG. 1 shows only the camera module 144 disposed in the transmission area TA, but it should not be limited thereto or thereby. For example, an additional camera module may be disposed on a rear surface of the electronic device 100. In addition, according to another exemplary embodiment, the camera module may be disposed only on the rear surface or a side surface of the electronic device 100.

Figure 2:
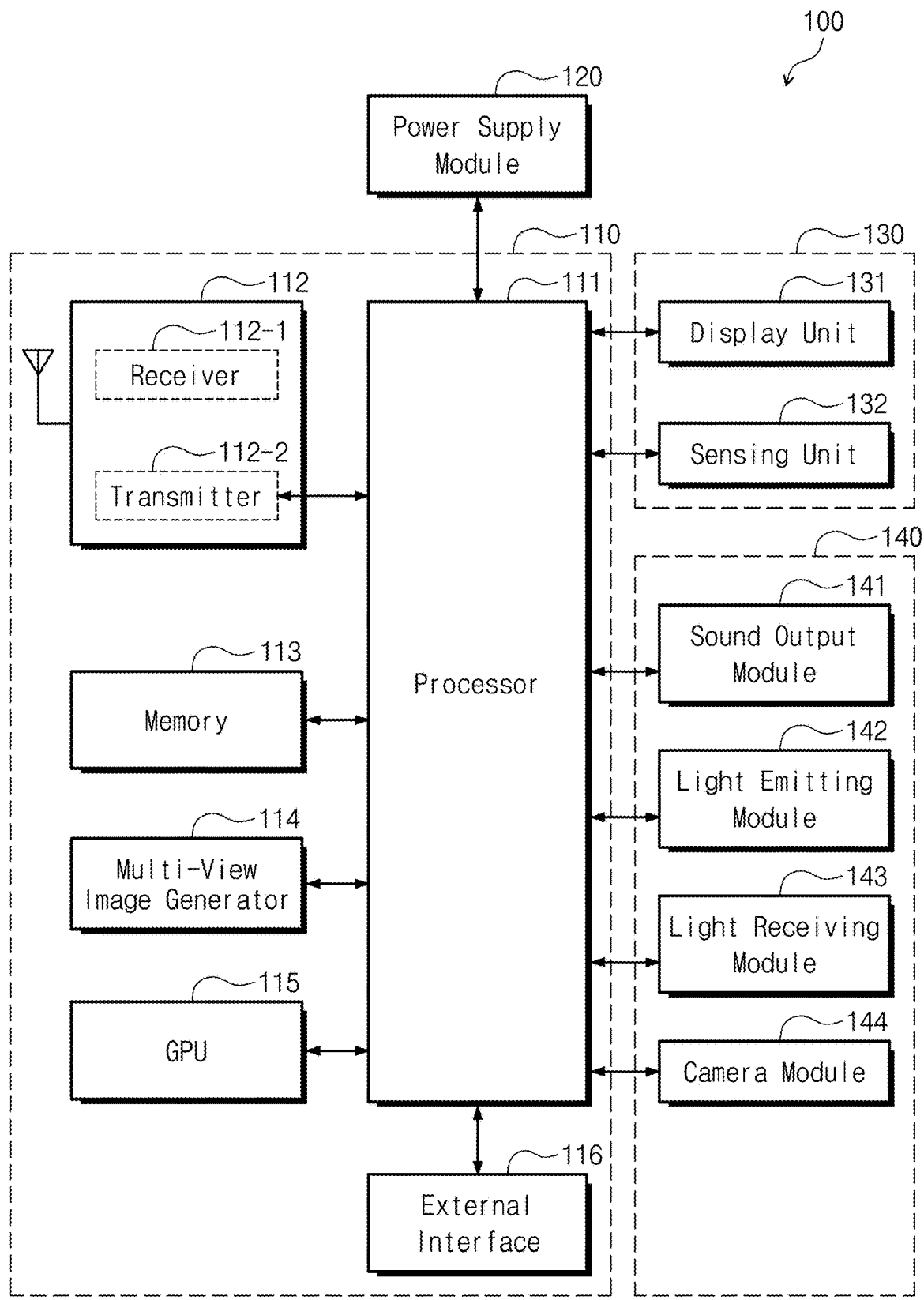
FIG. 2 is a block diagram illustrating an electronic device, according to an exemplary embodiment of the present disclosure.

FIG. 2 is a block diagram illustrating the electronic device 100, according to an exemplary embodiment of the present disclosure.

Referring to FIG. 2, the electronic device 200 includes a control module (e.g., a controller) 110, a power supply module (e.g., a power supply) 120, a display module 130, and an electronic module (e.g., an electronic circuit) 140. The control module 110, the power supply module 120, the display module 130, and the electronic module 140 may be electrically connected to each other.

The control module 110 and the electronic module 140 include various functional modules to operate the electronic device 100.

The control module 110 may include a processor 111, a wireless communication module (e.g., a wireless transceiver) 112, a memory 113, a multi-view image generator 114, a graphics processing unit 115 (GPU, also referred to as a graphics processor), and an external interface 116. Components of the control module 110 may be directly mounted on a mother board or may be electrically connected to the mother board through a connector after being mounted on a separate board.

The processor 111 controls an overall operation of the electronic device 100. The processor 111 may be an application processor (AP), a central processing unit (CPU), or a microprocessor. For example, the processor 111 may activate or inactivate the display module 130. The processor 111 may control other modules of the electronic module 140 based on a touch signal provided from the display module 130.

The wireless communication module 112 may transmit or receive a wireless signal to or from other terminals or a host device using mobile communications means, such as a Bluetooth, a Wi-Fi line, or the like. The wireless communication module 112 may transmit or receive a voice signal using a general communication line. The wireless communication module 112 includes a transmitter 112-2 that modulates and transmits a signal that is to be transmitted and a receiver 112-1 that demodulates a signal applied thereto.

The memory 113 may store a program code and user data, which may be utilized for the operation of the processor 111. In the present exemplary embodiment, the memory 113 may store augmented reality (AR) image data. In the present exemplary embodiment, the AR image data may include coordinate information and depth information of an AR object.

The multi-view image generator 114 may convert the AR image data stored in the memory 113 to multi-view AR images. For example, the multi-view image generator 114 may convert the AR image data to the multi-view AR images based on the coordinate information and the depth information. The multi-view image generator 114 may be a multi-view conversion unit (e.g., a multi-view convertor) including a multi-view virtual camera or a multi-view image generating algorithm.

The graphics processing unit 115 composes (e.g., blends or merges/integrates) the multi-view AR images with the real image (e.g., overlays the multi-view AR images onto the real image) from the camera module 144 to generate multi-view composition images. The processor 111 may map the multi-view composition images to image signals respectively corresponding to a plurality of pixels of a display unit (e.g., display) 131.

The external interface 116 acts as an interface connected to an external charger, a wired/wireless data port, or a card socket (e.g., a memory card or a SIM/UIM card).

The power supply module 120 supplies a power for the overall operation of the electronic device 100. The power supply module 120 may include a conventional battery module.

The display module 130 includes the display unit 131 and a sensing unit (e.g., sensor) 132. The display unit 131 may be a component that substantially generates the image IM. The image IM generated by the display unit 131 is displayed through the transmission area TA and is visible to a user from outside (e.g., from outside of the electronic device 100). In the present exemplary embodiment, the display unit 131 may be a three-dimensional display unit that displays the 3D image. For example, the display unit 131 may include a light-field display panel.

The sensing unit 132 senses a user's input TC applied thereto from the outside. The sensing unit 132 may sense the user's input TC provided to the window member 101. The user's input TC includes various types of external inputs generated by a part of user's body, such as light, heat, pressure, or the like. In addition, the electronic device 100 may sense the user's input TC applied to the side surface or the rear surface thereof based on a structure of the electronic device 100; however, the electronic device 100 is not limited thereto. The sensing unit 132 may apply the touch signal corresponding to the user's input TC to the processor 111.

The electronic module 140 may include a sound output module (e.g., a sound generator) 141, a light emitting module (e.g., a light emitter) 142, a light receiving module (e.g., a light receiver) 143, and the camera module (e.g., a camera) 144. The sound output module 141, the light emitting module 142, the light receiving module 143, and the camera module 144 may be directly mounted on the mother board or may be electrically connected to the control module 110 through a connector after being mounted on a separate board.

The sound output module 141 converts sound data provided from the wireless communication module 112 or sound data stored in the memory 113 and outputs the converted data to the outside (e.g., to outside of the electronic device 100).

The light emitting module 142 generates and outputs a light. The light emitting module 142 may output an infrared light. The light emitting module 142 may include a light emitting diode (LED). The light receiving module 143 may sense the infrared light. The light receiving module 143 may be activated when sensing the infrared light of a set or predetermined level or higher. The light receiving module 143 may include a complementary metal oxide semiconductor (CMOS) sensor. When the infrared light is generated by and output from the light emitting module 142, the infrared light may be incident into the light receiving module 143 after being reflected by an external subject (e.g., the part of the user's body or an object).

The camera module 144 captures (e.g., photographs) an external image. In the present exemplary embodiment, the camera module 144 provides the photographed real image to the processor 111. The camera module 144 may provide a two-dimensional (2D or planar) real image to the processor 111, however it should not be limited thereto or thereby. That is, the camera module 144 may provide a three-dimensional (3D or stereoscopic) image to the processor 111. For example, the camera module 144 may be a light-field camera.

Figure 3A:
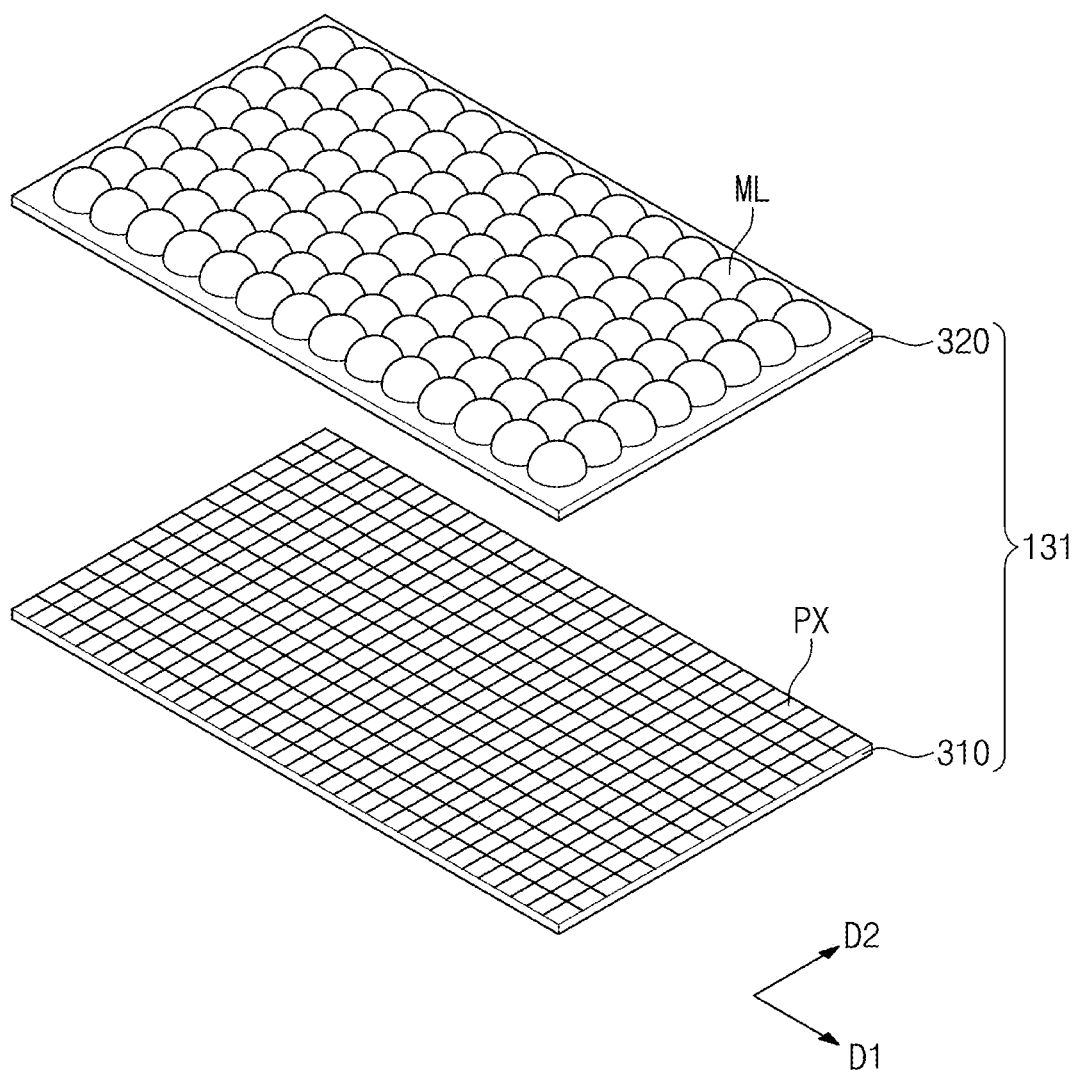
FIG. 3A is an exploded perspective view illustrating a display unit, according to an exemplary embodiment of the present disclosure.

FIG. 3A is an exploded perspective view illustrating a display unit, according to an exemplary embodiment of the present disclosure.

Referring to FIG. 3A, the display unit 131 may include a display panel 310 and a micro-lens array 320. In the present exemplary embodiment, the display unit 131 may be the light-field display unit.

The display panel 310 may include a plurality of pixels PX. Each of the pixels PX may include, for example, a red pixel, a green pixel, and a blue pixel. The pixels PX may be arranged in a matrix form along a first direction D1 and a second direction D2 substantially perpendicular to the first direction D1. The display panel 310 may be a plasma display panel, a liquid crystal display panel, or an organic light emitting display panel.

The micro-lens array 320 is disposed on the display panel 310. The micro-lens array 320 may include a plurality of micro-lenses ML. Lights generated by the pixels PX of the display panel 310 may form a light filed after passing through the micro-lenses ML of the micro-lens array 320.

The micro-lens array 320 includes active lenses. The micro-lens array 320 may generate an electric field in response to voltages applied to electrodes of the micro-lens array, and thus may change an alignment of liquid crystal molecules. The micro-lens array 320 transmits the image displayed through the display panel 310 in a 2D display mode as it is and may separate a field of view of the image displayed through the display panel 310 in a 3D display mode. For instance, the micro-lens array 320 operated in the 3D display mode allows the multi-view image displayed through the display panel 310 to be formed in a corresponding field of view for each viewpoint image using diffraction and refraction of light.

The arrangement of the pixels PX of the display panel 310, the arrangement of the micro-lenses ML of the micro-lens array 320, and a relative positional relationship between the pixels PX and the micro-lenses ML, which are to form the light field, should not be limited to FIG. 3A and may be implemented in various suitable embodiments.

Figure 3B:
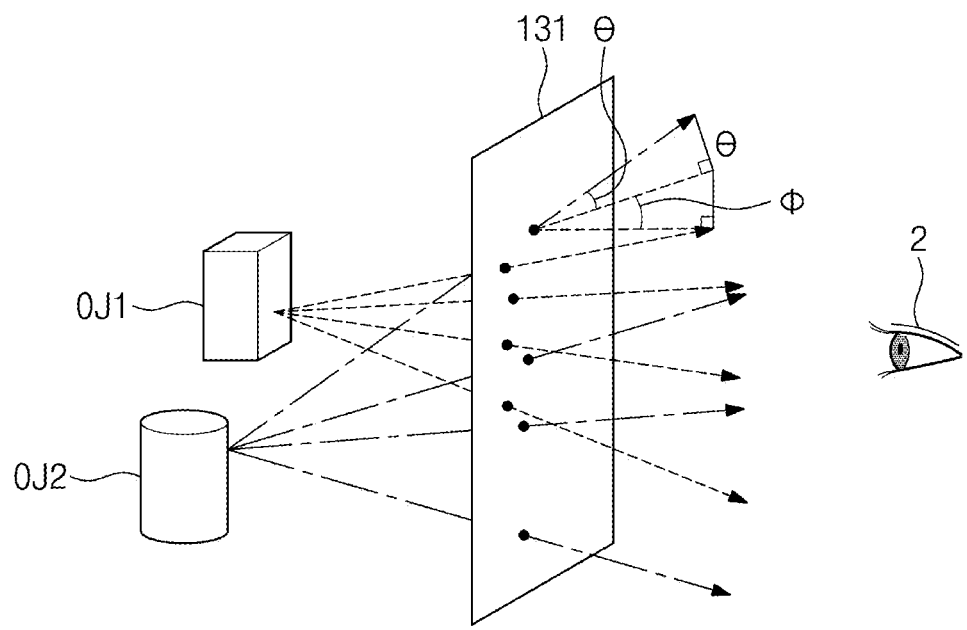
FIG. 3B is a diagram illustrating an example in which a user sees a three-dimensional image using a light-field display unit shown in FIG. 3A.

FIG. 3B is a diagram illustrating an example in which a user sees the 3D image using the light-field display unit shown in FIG. 3A.

Referring to FIG. 3B, the 'light field' is a concept used to describe a distribution of light in space through distribution rays. According to this concept, the light reflected by or generated from objects may be defined as a thing which goes straight in space and enters human eyes, and a 3D space may include a very large number of light fields. A five-dimensional plenoptic function (I(x, y, z, θ, φ)) may be used to mathematically express each light field. That is, the light field may be represented by 3D spatial coordinates (x, y, z) of a point through which a light ray passes through a plane on a specific plane in space and a luminance for spatial directional angles (θ, φ) to which the light ray is directed. The light field may be captured by informatizing plenoptic function values of the light ray passing through the above-mentioned specific plane (here, the plenoptic function may refer to a 5-dimensional function that represents the intensity or chromacity of the light observed from every position and direction in three-dimensional space). In other words, the light field may be captured by the luminance value for each angle (θ, φ) with respect to each of the coordinates (x, y, z) of a set or predetermined area. That is, the 3D image signal provided from the control module 110 shown in FIG. 1 may be provided to the display panel 310, the direction of the light ray generated by the display panel 310 may form the light field facing a specific direction (observation viewpoint) by the micro-lens array 320, and the user 2 may see objects OJ1 and OJ2 as the 3D image due to the 3D image information corresponding to the direction of the light ray.

FIGS. 3A and 3B show the micro-lens array-type light-field display unit 131, however, the display unit 131 should not be limited thereto or thereby. For example, the display unit 131 may be an integral imaging or multi-view display unit employing a parallax barrier, a lenticular lens, and/or the like.

Figure 4:
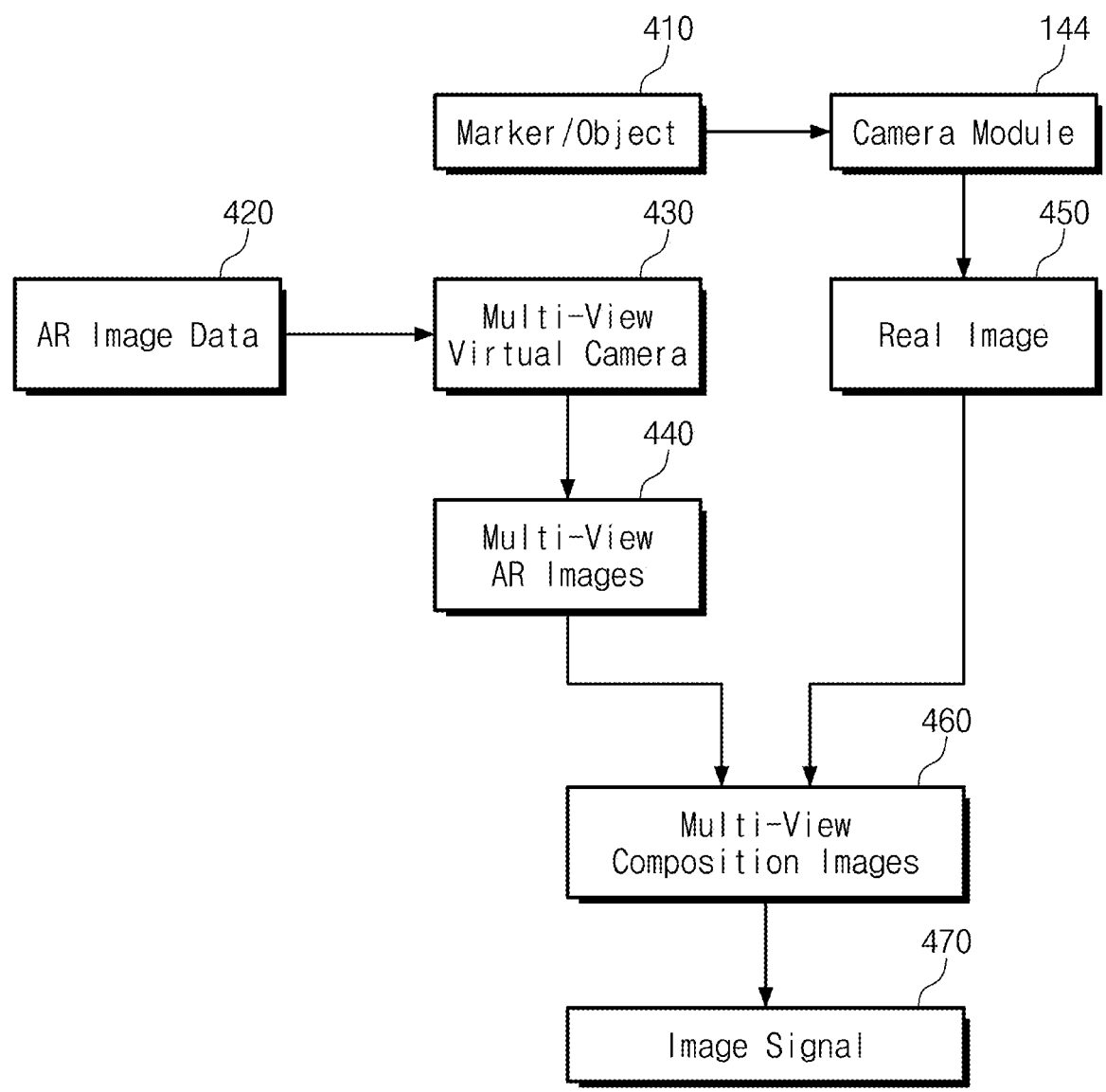
FIG. 4 is a diagram illustrating a process of outputting an image signal in an electronic system, according to an exemplary embodiment of the present disclosure.

FIG. 4 is a diagram illustrating a process of outputting an image signal in an electronic system, according to an exemplary embodiment of the present disclosure.

Referring to FIGS. 2 and 4, the camera module 144 photographs a marker or an object 410. The marker indicates a set or predetermined specific mark, and when the control module 110 or an augmented reality application program recognizes the marker, a prescribed reaction may be performed. A specific pattern like a QR code or a specific logo may be used as the marker. In a case where the electronic device 100 is operated in a simultaneous localization and mapping (SLAM) method, the electronic device 100 may recognize a surrounding environment to read information and space about a land feature. The camera module 144 may provide a real image 450 about the photographed marker or object 410 to the control module 110.

The AR image data 420 stored in the memory 113 may be converted to the multi-view AR images 440 by the multi-view image generator 114 shown in FIG. 2. In the present exemplary embodiment, the multi-view image generator 114 may be implemented by a multi-view virtual camera 430. The multi-view virtual camera 430 may be implemented by an application. The multi-view virtual camera 430 includes a plurality of virtual cameras and converts the AR image data 420 to the multi-view AR images 440 based on setting information about a distance between the virtual cameras and an angle.

The graphics processing unit 115 composes (e.g., blends or merges/integrates) the multi-view AR images 440 with the real image 450 (e.g., overlays the multi-view AR images 440 onto the real image 450) to generate the multi-view composition images 460. The processor 111 converts the multi-view composition images 460 to the image signals 470.

Figure 5:
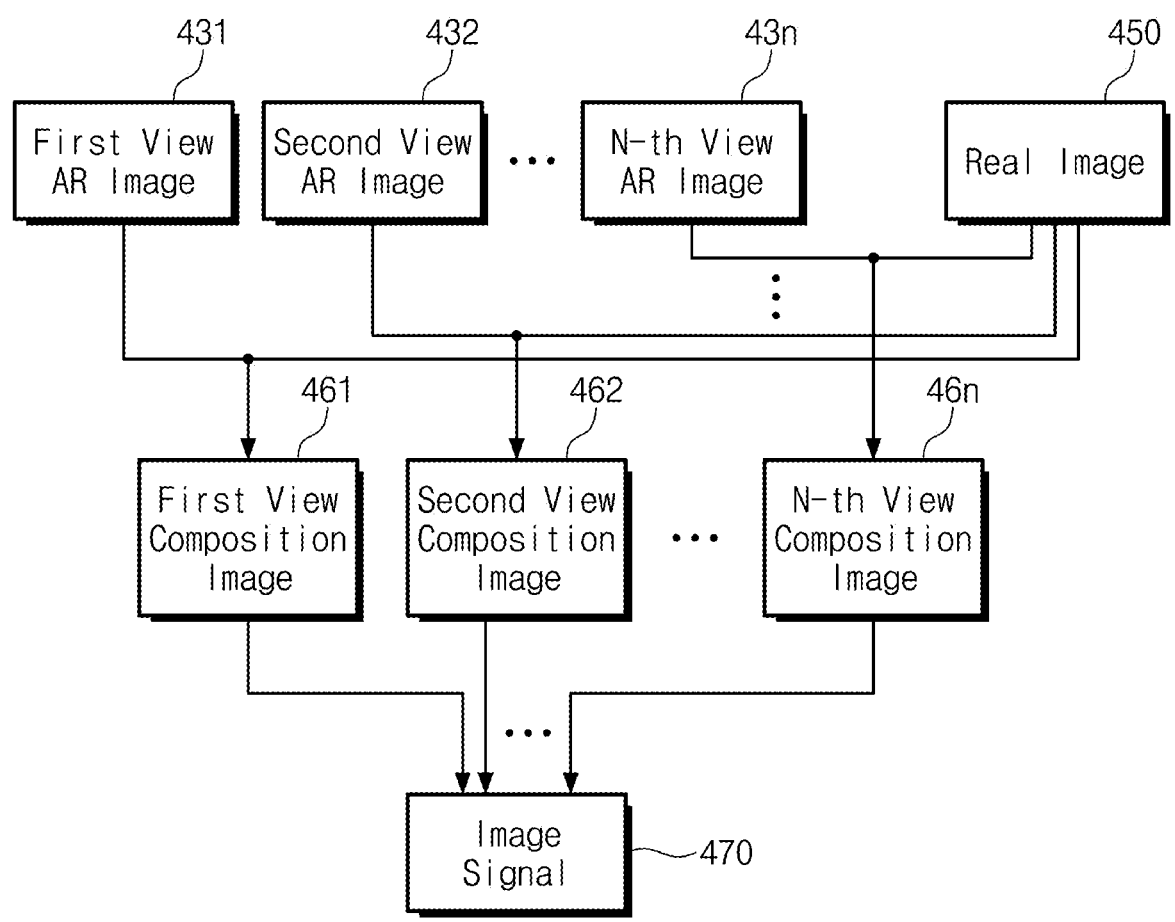
FIG. 5 is a diagram illustrating a process of generating an image signal by composing an augmented reality image with a real image in an electronic system, according to an exemplary embodiment of the present disclosure.

FIG. 5 is a diagram illustrating a process of generating the image signal by composing the augmented reality image with the real image in the electronic system, according to an exemplary embodiment of the present disclosure.

Referring to FIGS. 2, 4, and 5, the multi-view virtual camera 430 outputs multi-view AR images 431 to 43n from a first view to an N-th view. Each of the multi-view AR images 431 to 43n includes an AR object, and the multi-view AR images 431 have viewpoints different from each other with respect to the AR object. The multi-view virtual camera 430 may generate the multi-view AR images 431 to 43n based on a distance between set or predetermined virtual cameras and a separation distance between the AR object and the virtual cameras.

The real image 450 is an image with respect to the marker or the object photographed by the camera module 144 and is the 2D image.

The graphics processing unit 115 composes the multi-view AR images 431 to 43n with the real image 450 to generate multi-view composition images 461 to 46n.

The processor 111 may map the multi-view composition images 460 to the pixels PX shown in FIG. 3A and may output the image signal 470 of one frame. The processor 111 may perform a series of operations to rearrange the image having multi-view information according to a rule of light field view array in the unit of pixel by a multi-view image mapping algorithm.

Since the processor 111 provides the image signal 470 to the display unit 131, the 2D real image and the 3D AR image may be currently (e.g., substantially simultaneously) displayed through the electronic device 100.

Figure 6:
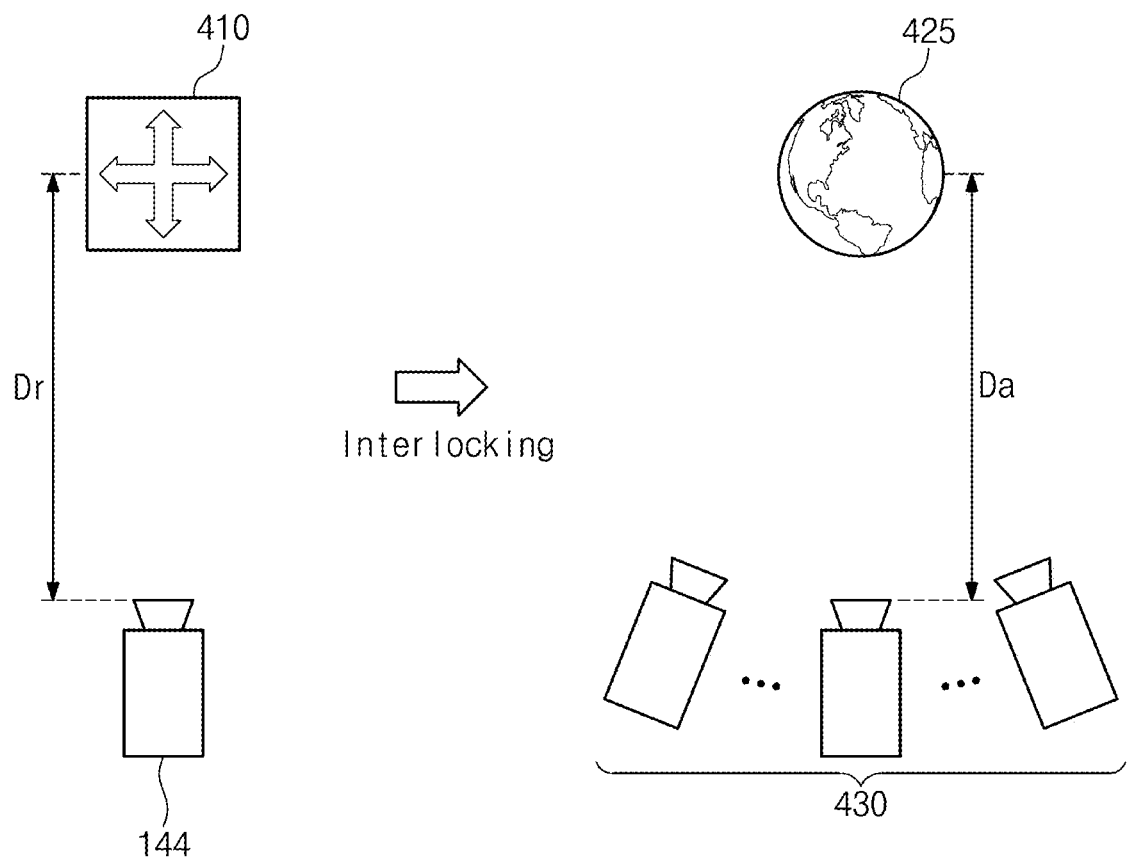
FIG. 6 is a diagram illustrating a virtual distance interlock between a virtual camera and an augmented reality image according to a distance between a real-image camera and a marker.

FIG. 6 is a diagram illustrating a virtual distance interlock between a virtual camera and an augmented reality image according to a distance between a real-image camera and a marker.

Referring to FIG. 6, the camera module 144 photographs the marker or object 410. In general, the camera module 144 (in detail, a lens of the camera module 144) is spaced apart from the marker or object 410 by a first separation distance Dr. The first separation distance Dr between the camera module 144 and the marker or object 410 may be obtained by measuring an amount of the infrared light that is incident into the light receiving module 143 (shown in FIG. 2) after being generated by the light emitting module 142 (shown in FIG. 2), output from the light emitting module 142, and reflected by the marker or object 410, however, it should not be limited thereto or thereby. That is, the first separation distance Dr may be measured by a distance measurement method using an ultrasonic sensor.

The processor 111 shown in FIG. 2 changes a second separation distance Da between the AR object 425 included in the AR image data 420 and the multi-view virtual camera 430 according to a variation of the first separation distance Dr when the first separation distance Dr between the camera module 144 and the marker or object 410 varies.

For example, when the first separation distance Dr between the camera module 144 and the marker or object 410 becomes greater than a reference value, that is, the camera module 144 moves farther away from the marker or object 410, the multi-view virtual camera 430 may recognize that a size of the object 425 is smaller than a reference size and may generate the multi-view AR images 440 based on the recognized result. When the first separation distance Dr between the camera module 144 and the marker or object 410 becomes smaller than the reference value, that is, the camera module 144 approaches the marker or object 410, the multi-view virtual camera 430 may recognize that the size of the object 425 is greater than the reference size and may generate the multi-view AR images 440 based on the recognized result. However, the present disclosure should not be limited thereto or thereby. For instance, when the first separation distance Dr between the camera module 144 and the marker or object 410 becomes greater than the reference value, the multi-view virtual camera 430 may recognize that the size of the object 425 is greater than the reference size and may generate the multi-view AR images 440 based on the recognized result.

FIG. 6 shows only the first separation distance Dr between the camera module 144 and the marker or object 410, however, an angle of the multi-view virtual camera 430 may be changed depending on a change in angle of the camera module 144, that is, a change of photography angle of the camera module 144 with respect to the marker or object 410. In this case, the multi-view virtual camera 430 may generate the multi-view AR images 440 by taking into account the change in angle of the camera module 144.

Figure 7:
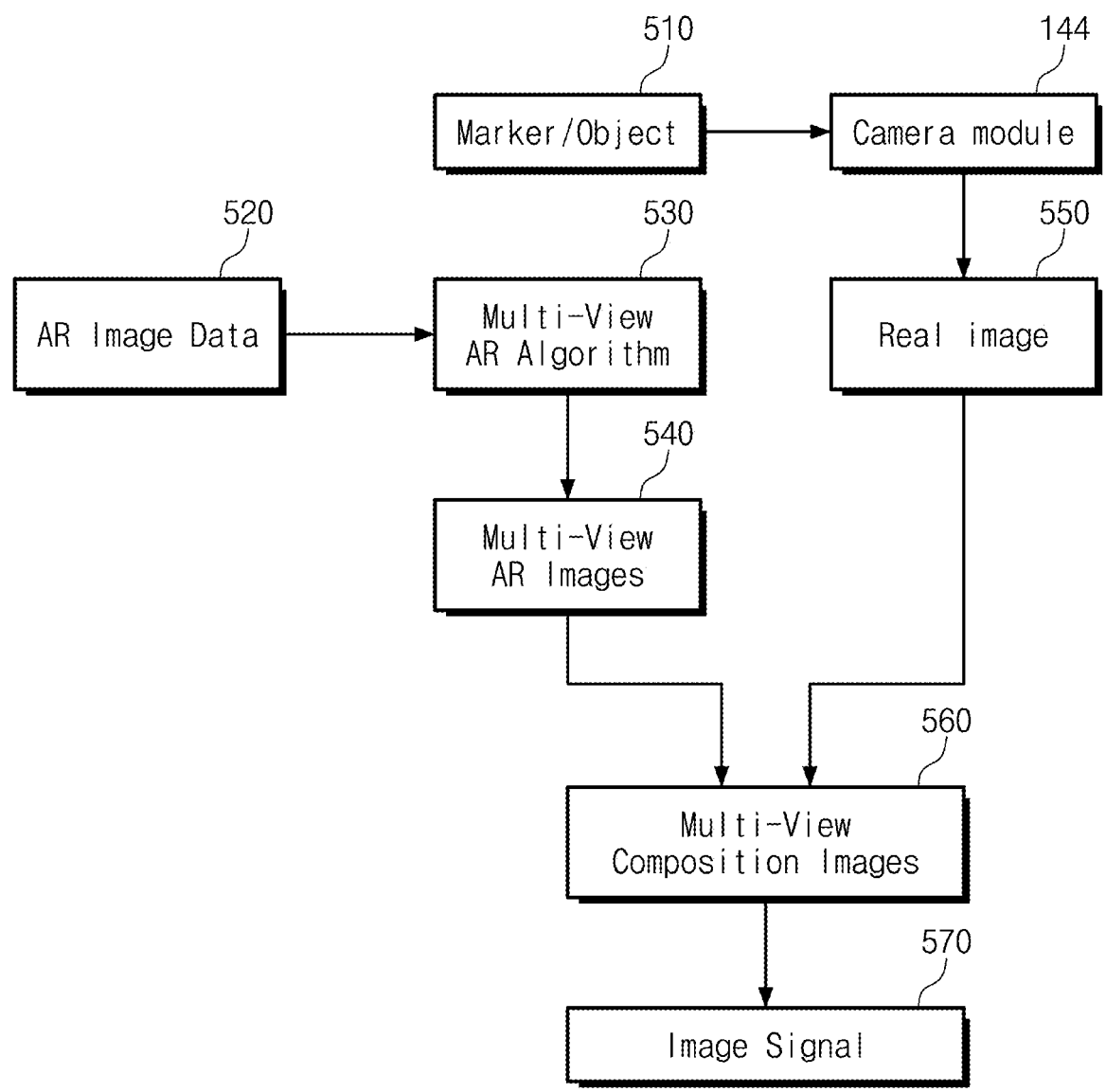
FIG. 7 is a diagram illustrating an operation of an electronic system, according to another exemplary embodiment of the present disclosure.

FIG. 7 is a view illustrating an operation of an electronic system, according to another exemplary embodiment of the present disclosure.

Referring to FIGS. 2 and 7, the camera module 144 photographs a marker or an object 510. The camera module 144 may provide a real image 550 about the photographed marker or object 510 to the control module 110.

AR image data 520 stored in the memory 113 may be converted to multi-view AR images 540 by the multi-view image generator 114 shown in FIG. 2. In the present exemplary embodiment, the multi-view image generator 114 may be implemented by a multi-view AR algorithm 530. The multi-view AR algorithm 530 may be implemented by a program code and may be stored in the memory 113 or in a separate storage device.

The graphics processing unit 115 composes the multi-view AR images 540 with a real image 550 to generate multi-view composition images 560. The processor 111 converts the multi-view composition images 560 to an image signal 570.

Figure 8:
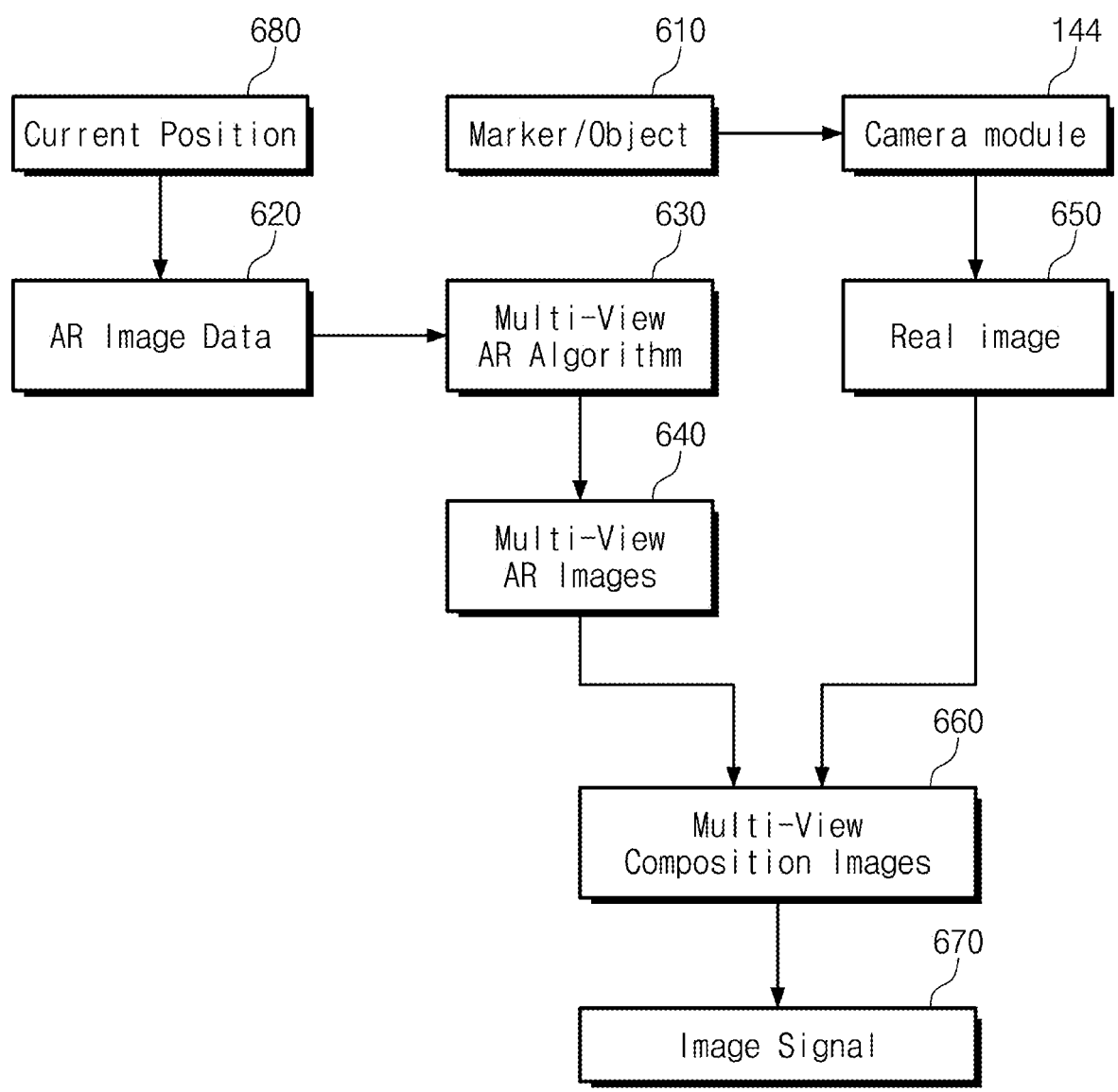
FIG. 8 is a diagram illustrating an operation of an electronic system, according to another exemplary embodiment of the present disclosure.

FIG. 8 is a diagram illustrating an operation of an electronic system, according to another exemplary embodiment of the present disclosure.

Referring to FIGS. 2 and 8, the camera module 144 photographs a marker or an object 610. The camera module 144 may provide a real image 650 about the photographed marker or object 610 to the control module 110.

The receiver 112-1 of the wireless communication module 112 may receive a signal provided from a global positioning system (GPS) satellite. The processor 111 identifies a current position 680 of the electronic device 100 based on the signal provided from the GPS satellite. In addition, the transmitter 112-2 of the wireless communication module 112 may transmit the current position 680 of the electronic device 100 to an external host device. The external host device may provide the AR image data corresponding to the current position 680 of the electronic device 100 to the electronic device 100. The receiver 112-1 receives the AR image data from the external host device.

AR image data 620 provided from the external host device through the receiver 112-1 are converted to multi-view AR images 640 by the multi-view virtual camera 430.

The graphics processing unit 115 composes the multi-view AR images 640 with the real image 650 to generate multi-view composition images 660. The processor 111 converts the multi-view composition images 660 to an image signal 670.

For example, in a case where the electronic device 100 is operated in a navigation mode, the AR object may be displayed together with a road image that is the real image 650 photographed by the camera module 144. In the present exemplary embodiment, the AR object may be information about a driving direction or information for assisting driving. In addition, in the present exemplary embodiment, the AR image data with respect to the AR object may be provided from the external host device through the receiver 112-1.

Figure 9:
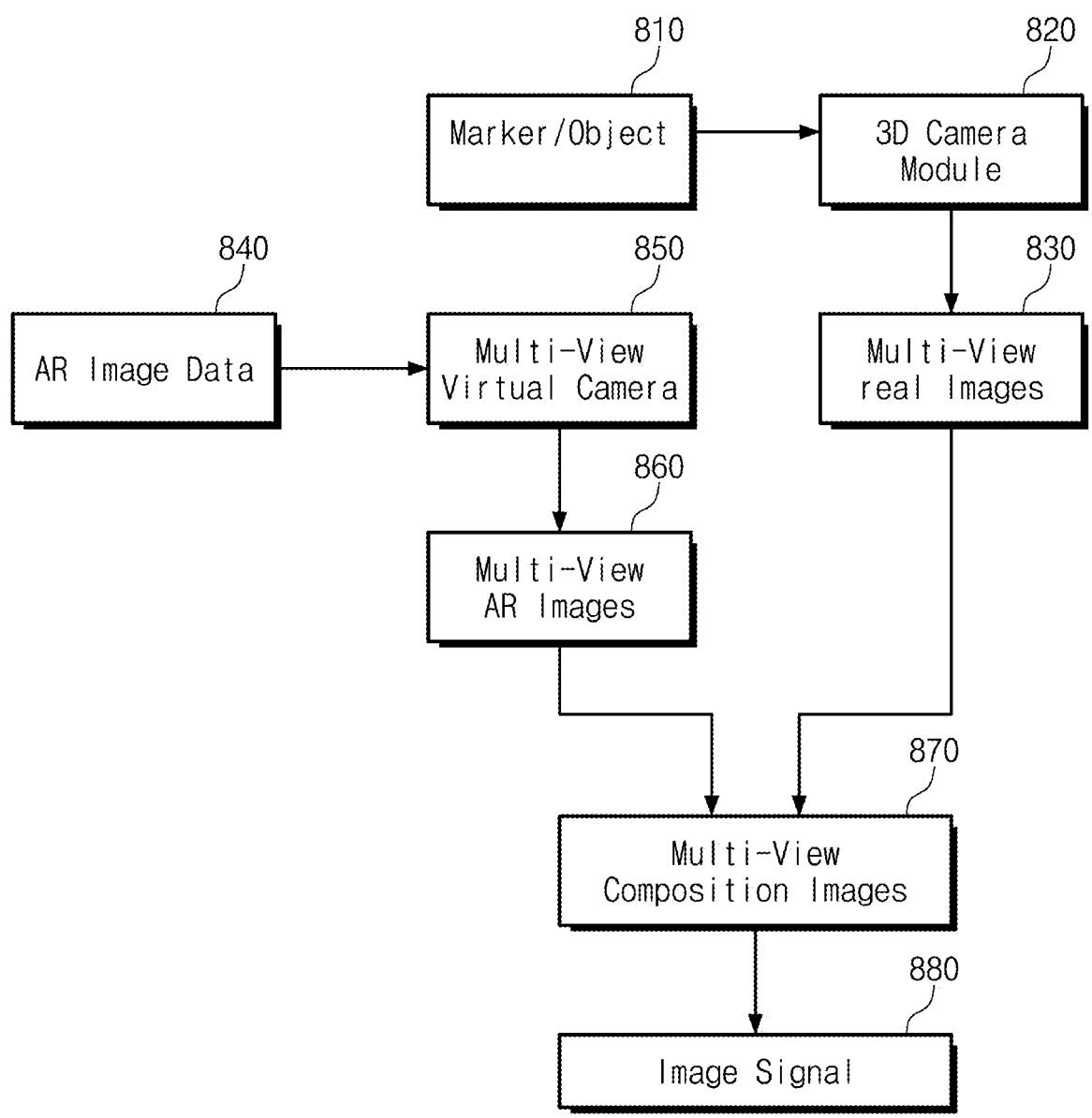
FIG. 9 is a diagram illustrating an operation of an electronic system, according to another exemplary embodiment of the present disclosure.

FIG. 9 is a diagram illustrating an operation of an electronic system, according to another exemplary embodiment of the present disclosure.

Referring to FIG. 9, a 3D camera module (e.g., a 3D camera) 820 photographs a marker or an object 810. The 3D camera module 820 may provide multi-view real images 830 about the photographed marker or object 810 to the control module 110 shown in FIG. 2.

For example, the 3D camera module 820 may be the light-field camera. The 3D light-field camera may be a camera used to capture the light-field and may record a luminance value for each angle ($\theta$, $\varphi$) with respect to all coordinates in a set or predetermined area when compared with a 2D light-field camera that records a luminance value for a specific point in a space, that is, the luminance value for each coordinate (x, y).

According to another embodiment, the 3D camera module 820 may include two or more cameras that obtain depth information.

AR image data 840 stored in the memory 113 shown in FIG. 2 may be converted to multi-view AR images 860 by a multi-view virtual camera 850.

The graphics processing unit 115 composes the multi-view AR images 860 with the multi-view real images 830 to generate multi-view composition images 870. The processor 111 shown in FIG. 2 converts the multi-view composition images 870 to an image signal 880.

Figure 10:
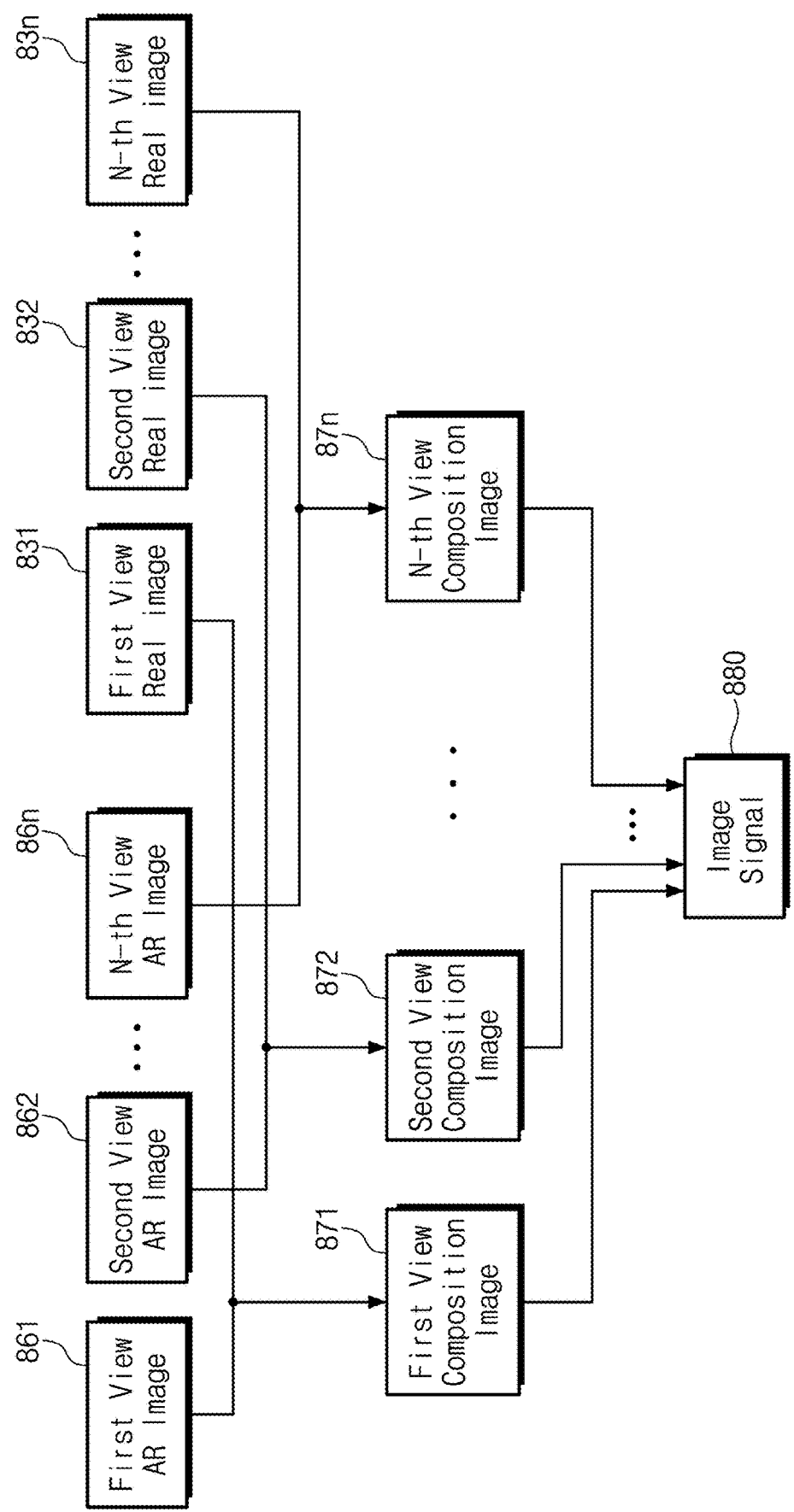
FIG. 10 is a diagram illustrating a process of generating an image signal by composing an augmented reality image with a three-dimensional real image in an electronic system, according to another exemplary embodiment of the present disclosure.

FIG. 10 is a diagram illustrating a process of generating the image signals by composing the AR image with the 3D real image in the electronic system, according to another exemplary embodiment of the present disclosure.

Referring to FIGS. 2, 9, and 10, the multi-view virtual camera 850 outputs multi-view AR images 861 to 86n from a first view to an N-th view. Each of the multi-view AR images 861 to 86n includes an AR object, and the multi-view AR images 861 to 86n have viewpoints different from each other with respect to the AR object. The multi-view virtual camera 850 may generate the multi-view AR images 861 to 86n based on a distance between set or predetermined virtual cameras and a separation distance between the AR object and the virtual cameras.

The multi-view real images 831 to 83n are 3D images with respect to the marker or the object, which are photographed by the 3D camera module 820. In the present exemplary embodiment, the multi-view AR images 861 to 86n and the multi-view real images 831 to 83n include the same N multi-view images, however, the number of views of the multi-view AR images 861 to 86n may be different from the number of views of the multi-view real images 831 to 83n. For example, in a case where the multi-view virtual camera 850 generates 32 multi-view AR images and the 3D camera module 820 provides 16 multi-view real images, the control module 110 shown in FIG. 2 may generate 32 multi-view real images by applying an interpolation or extrapolation algorithm to 16 multi-view real images.

The graphics processing unit 115 composes the multi-view AR images 861 to 86n with the multi-view real images 831 to 83n to generate multi-view composition images 871 to 87n from a first view to an N-th view.

The processor 111 may map the multi-view composition images 871 to 87n to the pixels PX shown in FIG. 3A and may output the image signal 880 of one frame. The processor 111 may perform a series of operations to rearrange the image having multi-view information in the unit of pixel according to a rule of light field view array by a multi-view image mapping algorithm.

Since the processor 111 provides the image signal 880 to the display unit 131, the 3D real image and the 3D AR image may be concurrently (e.g., substantially simultaneously) displayed through the electronic device 100.

Figure 11:
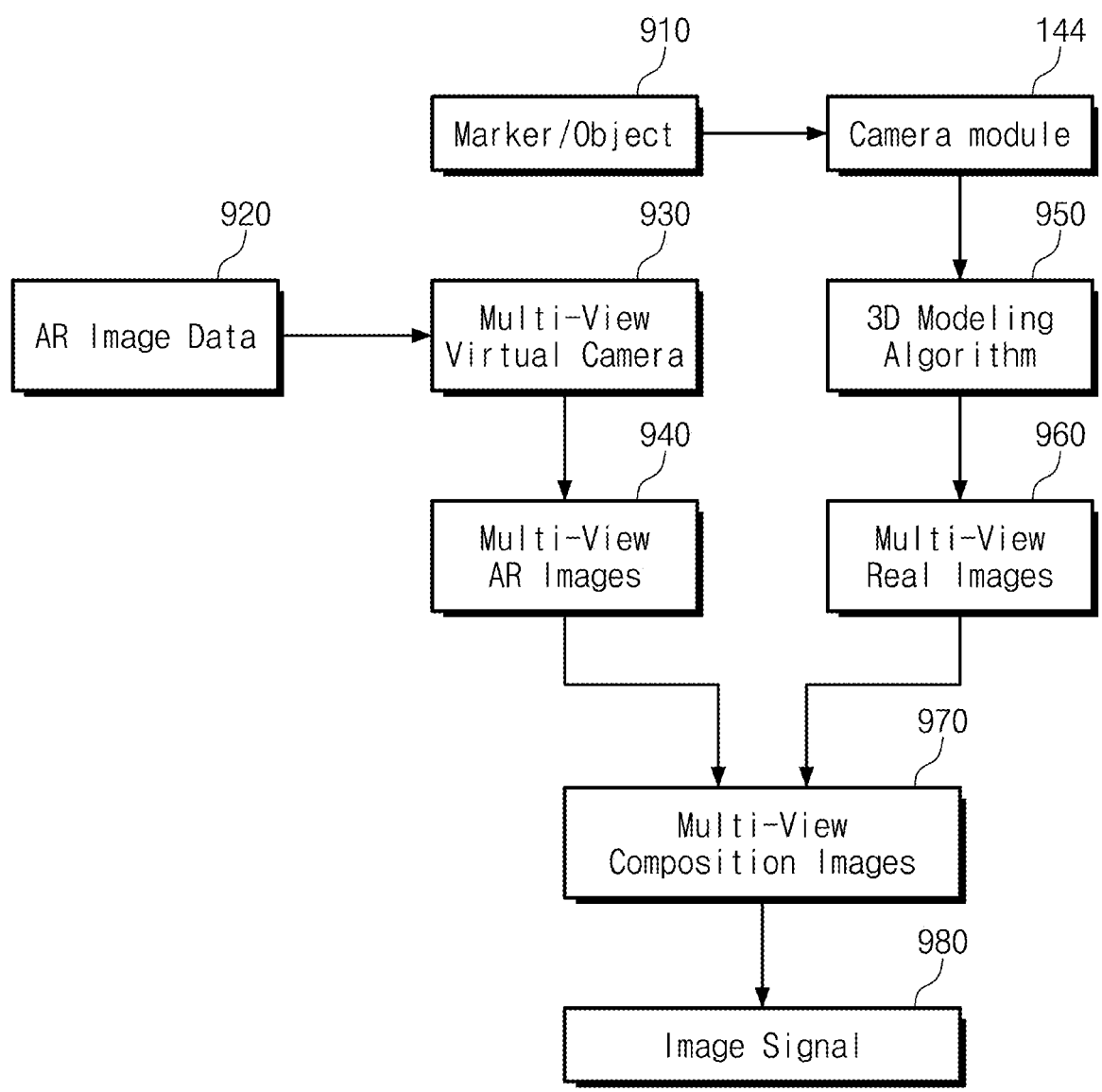
FIG. 11 is a diagram illustrating an operation of an electronic system, according to another exemplary embodiment of the present disclosure.

FIG. 11 is a diagram illustrating an operation of an electronic system, according to another exemplary embodiment of the present disclosure.

Referring to FIG. 11, the camera module 144 photographs a marker or an object 910. The camera module 144 may provide a 2D real image about the photographed marker or object 910 to the control module 110 shown in FIG. 2.

The processor 111 of the control module 110 may include a 3D modeling algorithm 950. The processor 111 may convert the 2D real image provided from the camera module 144 to 3D multi-view real images 960. According to another embodiment, the 3D modeling algorithm 950 may be included in the graphics processing unit 115.

AR image data 920 stored in the memory 113 shown in FIG. 2 may be converted to multi-view AR images 940 by a multi-view virtual camera 930.

The graphics processing unit 115 composes the multi-view AR images 940 with the multi-view real image 960 to generate multi-view composition images 970. The processor 111 shown in FIG. 2 converts the multi-view composition images 970 to an image signal 980.

Figure 12:
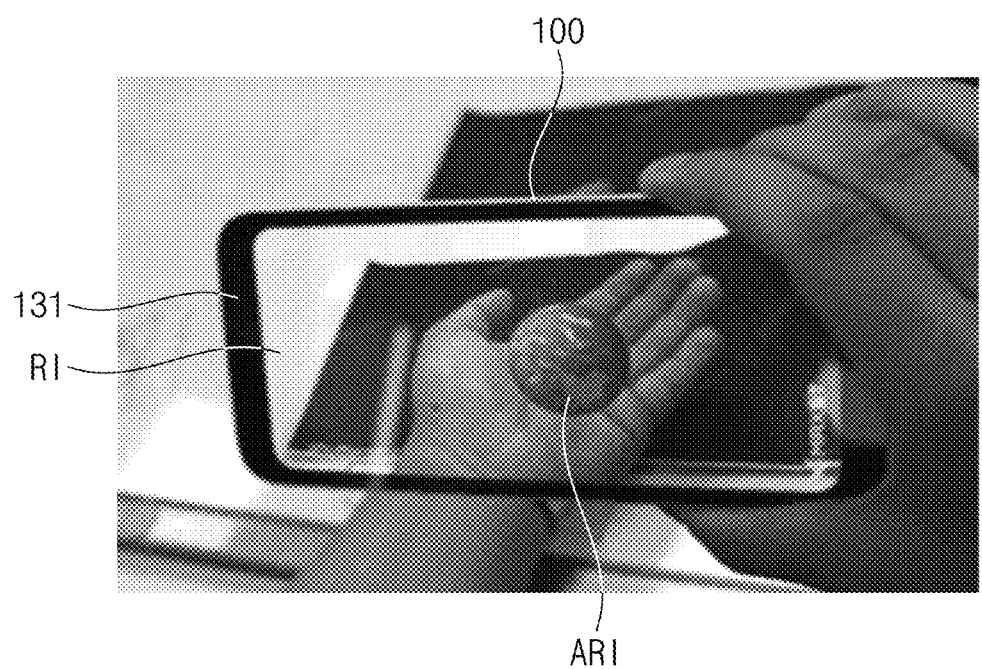
FIG. 12 is a view illustrating an augmented reality image displayed through a display unit of an electronic device, according to an exemplary embodiment of the present disclosure.

FIG. 12 is a view illustrating the AR image displayed through the display unit of the electronic device, according to an exemplary embodiment of the present disclosure.

Referring to FIG. 12, when a camera module disposed on the rear surface of the electronic device 100 photographs an object, a 2D real image RI and a 3D AR image ARI may be displayed through the display unit 131.

Figure 13:
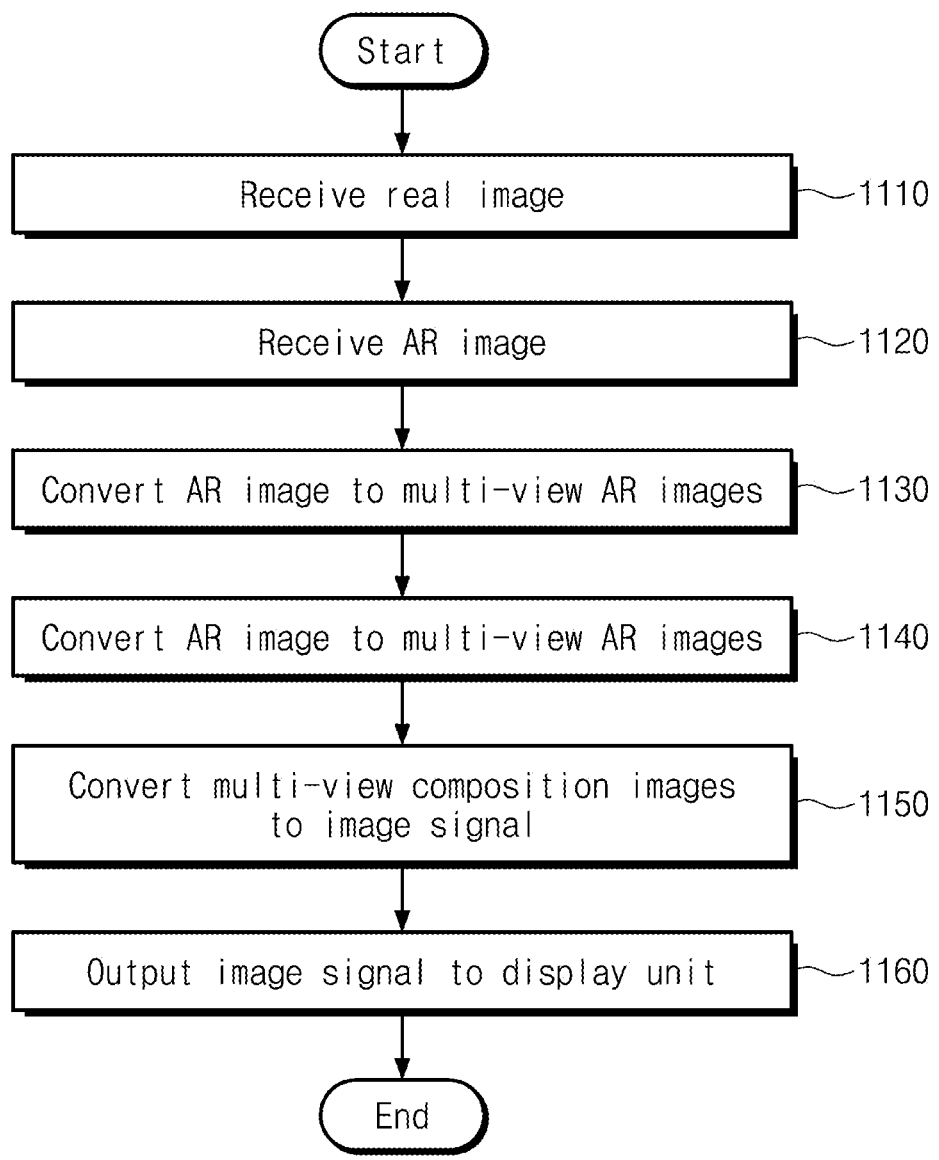
FIG. 13 is a flow diagram illustrating a method of displaying an augmented reality image, according to an exemplary embodiment of the present disclosure.

FIG. 13 is a flow diagram illustrating a method of displaying the AR image, according to an exemplary embodiment of the present disclosure. For the convenience of explanation, the method of displaying the AR image will be described with reference to the electronic device shown in FIGS. 1 to 12, however, the method should not be limited to the electronic device 100.

Referring to FIGS. 2, 5, and 13, the processor 111 of the control module 110 receives the real image from the camera module 144 (1110). The real image may be the image signal with respect to the marker or object, which is photographed by the camera module 144.

The processor 111 receives the AR image data stored in the memory 113 (1120).

The processor 111 controls the multi-view image generator 114 to convert the AR image data to the multi-view AR images 431 to 43n (1130).

The processor 111 controls the graphics processing unit 115 to compose the multi-view AR images 431 to 43n with the real image 450 (1140).

The processor 111 performs the mapping operation to rearrange the multi-view composition images 461 to 46n composed by the graphics processing unit 115 in the unit of pixel of the display unit 131 (1150).

The processor 111 outputs the image signal 470 to the display unit 131 (1160). As a result, the 2D real image and the 3D AR image may be concurrently (e.g., substantially simultaneously) displayed through the display unit 131 of the electronic device 100.

Although the exemplary embodiments of the present disclosure have been described, it is understood that the present disclosure should not be limited to these exemplary embodiments but various changes and modifications can be made by one ordinary skilled in the art within the spirit and scope of the present disclosure.

Therefore, the disclosed subject matter should not be limited to any single embodiment described herein, and the scope of the present inventive concept shall be determined according to the attached claims and equivalents thereof.

What is claimed is:

1. An electronic device comprising:
    a display configured to display a three-dimensional image;
    a camera configured to photograph a real image; and
    a controller configured to generate an image signal based on the real image and augmented reality (AR) image data and to provide the image signal to the display, the controller comprising:
        a multi-view image generator configured to convert the AR image data into multi-view AR images;
        a graphics processor configured to compose each of the multi-view AR images with the real image to generate multi-view composition images; and
        a processor configured to control a multi-view virtual camera and the graphics processor, to convert the multi-view composition images into the image signal, and to provide the image signal to the display,
    wherein the display comprises a light-field display, and the light-field display comprises:
        a display panel comprising a plurality of pixels; and
        a micro-lens array on the display panel and comprising a plurality of micro-lenses.

2. The electronic device of claim 1, wherein the controller further comprises a memory configured to store the AR image data.

3. The electronic device of claim 1, wherein the real image comprises at least one of a marker and an object, and each of the multi-view AR images comprises an AR object.

4. The electronic device of claim 3, wherein, when a first separation distance between the camera and at least one of the marker and the object is changed, the processor is configured to control the multi-view image generator such that a second separation distance between the multi-view image generator and the AR object is changed based on an amount of change of the first separation distance.

5. The electronic device of claim 1, wherein the multi-view image generator utilizes a plurality of virtual cameras that convert the AR image data to the multi-view AR images respectively corresponding to a plurality of views.

6. The electronic device of claim 1, wherein the multi-view image generator is configured to convert the AR image data to the multi-view AR images respectively corresponding to a plurality of views.

7. The electronic device of claim 6, wherein the controller further comprises a wireless transceiver configured to receive the AR image data from an outside of the electronic device in a wireless communication manner.

8. The electronic device of claim 1, wherein the processor is configured to map the multi-view composition images to the image signal respectively corresponding to the pixels.

9. The electronic device of claim 1, wherein the processor is further configured to model the real image three-dimensionally to generate multi-view real images, and the graphics processor composes each of the multi-view AR images with multi-view real images to generate the multi-view composition images.

10. The electronic device of claim 1, wherein the camera comprises a three-dimensional camera that photographs a three-dimensional real image.

11. The electronic device of claim 10, wherein the processor generates multi-view real images based on the three-dimensional real image, and the graphics processor composes each of the multi-view AR images with the multi-view real images to generate the multi-view composition images.

12. The electronic device of claim 1, wherein the AR image data comprise coordinate information and depth information corresponding to an AR object.

13. A method of operating an electronic device comprising a three-dimensional image, the method comprising:
   receiving a real image from a camera;
   receiving AR image data;
   converting the AR image data to multi-view AR images;
   composing the multi-view AR images with the real image to generate multi-view composition images;
   converting the multi-view composition images to an image signal; and
   outputting the image signal to the display,
   wherein the display comprises a light-field display, and the light-field display comprises:
      a display panel comprising a plurality of pixels; and
      a micro-lens array on the display panel and comprising a plurality of micro-lenses.

14. The method of claim 13, wherein the electronic device further comprises a memory configured to store the AR image data.

15. The method of claim 13, wherein the AR image data are received from an outside in a wireless communication manner.

16. The method of claim 13, wherein the real image comprises at least one of a marker and an object, and each of the multi-view AR images comprises an AR object.

17. The method of claim 16, wherein the converting of the AR image data to the multi-view AR images comprises:
   when a first separation distance between the camera and at least one of the marker and the object is changed, changing a size of the AR object in each of the multi-view AR images based on an amount of change of the first separation distance.

18. The method of claim 13, wherein the receiving of the real image from the camera comprises modeling the real image three-dimensionally to generate multi-view real images, and the composing the multi-view AR images with the real image comprises composing the multi-view AR images with the multi-view real images.

19. The method of claim 13, wherein the converting of the multi-view composition images to the image signal comprises mapping the multi-view composition images to respectively correspond to the pixels of the display panel so that the multi-view composition images are converted to the image signal.

* * * * *